(12) United States Patent
Inoue et al.

(10) Patent No.: US 10,379,343 B2
(45) Date of Patent: Aug. 13, 2019

(54) SADDLE RIDING VEHICLE

(71) Applicants: HONDA MOTOR CO., LTD., Minato-ku, Tokyo (JP); NIPPON SEIKI CO., LTD., Nagaoka, Niigata (JP)

(72) Inventors: Hayato Inoue, Wako (JP); Takeshi Kitajima, Wako (JP); Hideki Ikarasi, Nagaoka (JP); Norihiro Ogawa, Nagaoka (JP)

(73) Assignees: Honda Motor Co., Ltd., Tokyo (JP); Nippon Seiko Co., Ltd., Niigata (JP)

( * ) Notice: Subject to any disclaimer, the term of this patent is extended or adjusted under 35 U.S.C. 154(b) by 0 days.

(21) Appl. No.: 15/925,861

(22) Filed: Mar. 20, 2018

(65) Prior Publication Data

US 2018/0275401 A1 Sep. 27, 2018

(30) Foreign Application Priority Data

Mar. 24, 2017 (JP) .................... 2017-059594

(51) Int. Cl.
*G02B 27/01* (2006.01)
*B62J 99/00* (2009.01)

(52) U.S. Cl.
CPC .......... *G02B 27/0101* (2013.01); *B62J 99/00* (2013.01); *G02B 27/0149* (2013.01); *B62J 2099/0033* (2013.01); *G02B 2027/013* (2013.01); *G02B 2027/0181* (2013.01); *G02B 2027/0183* (2013.01)

(58) Field of Classification Search
CPC ........................ G02B 27/01; G02B 27/0101; G02B 27/0149; G02B 27/0176; B62J 1/12; B62J 1/28
See application file for complete search history.

(56) References Cited

U.S. PATENT DOCUMENTS

| | | | |
|---|---|---|---|
| 2002/0126391 A1* | 9/2002 | Kushida | B62J 17/04 359/630 |
| 2004/0135679 A1 | 7/2004 | Kushida et al. | |
| 2008/0128190 A1* | 6/2008 | Tsutsumi | B60Q 9/00 180/219 |
| 2015/0268468 A1 | 9/2015 | Masuda et al. | |

(Continued)

FOREIGN PATENT DOCUMENTS

| | | |
|---|---|---|
| EP | 1 143 286 A1 | 10/2001 |
| JP | S62-197175 U | 12/1987 |
| JP | 2007-225572 A | 9/2007 |

(Continued)

OTHER PUBLICATIONS

Extended European search report dated Aug. 3, 2018 issued in the corresponding EP Patent Application No. 18163393.4.

(Continued)

*Primary Examiner* — Sultan Chowdhury
(74) *Attorney, Agent, or Firm* — Carrier Blackman & Associates, P.C.; William D. Blackman; Joseph P. Carrier

(57) ABSTRACT

A saddle riding vehicle includes: a meter apparatus; and a head-up display apparatus including a projection unit and a combiner to which an image from the projection unit is projected. The meter apparatus is arranged at a position overlapping with an optical path from the projection unit to the combiner as viewed in plan view.

5 Claims, 5 Drawing Sheets

(56) References Cited

U.S. PATENT DOCUMENTS

2016/0334637 A1* 11/2016 Saisho ............... G02B 27/0101
2017/0054963 A1*  2/2017 Kasazumi .............. B60K 35/00

FOREIGN PATENT DOCUMENTS

| JP | 2011-143800 A | 7/2011 |
| JP | 2015-087505 A | 5/2015 |
| JP | 2016-142961 A | 8/2016 |
| JP | 2016-203841 A | 12/2016 |
| JP | 2017-007614 A | 1/2017 |

OTHER PUBLICATIONS

Official Communication issued in the corresponding Japanese Patent Application No. 2017-059594 dated Oct. 24, 2018.

* cited by examiner

SADDLE RIDING VEHICLE

BACKGROUND OF THE INVENTION

Field of the Invention

The present invention relates to a head-up display apparatus mounted on a saddle riding vehicle such as a two-wheeled motor vehicle.

Description of the Related Art

A head-up display apparatus is disclosed in Japanese Patent Application Laid-open No. 2016-142961. The head-up display apparatus includes a projection unit that emits light of a display image, and a combiner for generating a virtual image on the basis of a projection image projected from the projection unit. The projection unit and the combiner are fixed to a single common case body. The case body fulfills a role for securing a sufficient optical path length between the projection unit and the combiner.

It has been proposed to mount a head-up display apparatus on a two-wheeled motor vehicle. However, if the head-up display apparatus is arranged in front of or in the rear of a meter apparatus such as a speedometer or a tachometer, increase in size of a meter housing or a head-lamp cowl is a concern. If the distance from the projection unit to the combiner is reduced in order to avoid such increase in size, this gives rise to reduction of the size of the virtual image caused by the reduction of the optical path length.

SUMMARY OF THE INVENTION

The present invention has been accomplished in light of the above circumstances, and it is an object of the present invention to provide a head-up display apparatus for a saddle riding vehicle by which reduction in space is implemented and a sufficient optical path length that is the distance between a projection unit and a combiner can be secured.

In order to achieve the object, according to a first aspect of the present invention, there is provided a saddle riding vehicle, comprising: a meter apparatus; and a head-up display apparatus including a projection unit and a combiner to which an image from the projection unit is projected, wherein the meter apparatus is arranged at a position overlapping with an optical path from the projection unit to the combiner as viewed in plan view.

With the first aspect of the present invention, since the meter apparatus is arranged at the position overlapping with the optical path from the projection unit to the combiner as viewed in plan view, a sufficient distance is secured between the projection unit and the combiner, in the arrangement space of the meter apparatus, in comparison with that in an alternative case in which both the projection unit and the combiner are disposed in front of or in the rear of the meter apparatus. Therefore, the arrangement space is reduced, and reduction in space is implemented. Besides, the optical path length that is the distance between the projection unit and the combiner is secured sufficiently.

According to a second aspect of the present invention, in addition to the first aspect, the projection unit is coupled to a lower portion of the meter apparatus such that at least part of the projection unit overlaps with the meter apparatus as viewed in plan view.

With the second aspect of the present invention, since the meter apparatus covers the projection unit from above in the direction of the gravity, the meter apparatus can achieve a waterproof function and a dustproof function for the projection unit. Besides, since the meter apparatus, projection unit and combiner can be formed as an assembly, the head-up display apparatus can be assembled simply to the vehicle body. Since the location from the projection unit to the combiner is reinforced by the housing of the meter apparatus so as to increase the strength, the positional relationship between the light source of the projection unit and the combiner is less likely to be broken, and the projection accuracy of a virtual image can be secured.

According to a third aspect of the present invention, in addition to the first or second aspect, the meter apparatus has a display face that is inclined forwardly upwardly at a first angle with respect to a horizontal plane, and the projection unit has an optical path that is inclined forwardly upwardly at a second angle greater than the first angle with respect to the horizontal plane.

With the third aspect of the present invention, since the optical path of the projection unit is inclined with respect to the display face of the meter apparatus, the optical path length between the projection unit and the combiner can be secured while the length in the front-rear direction of the meter apparatus and the head-up display apparatus is suppressed.

According to a fourth aspect of the present invention, in addition to the first or second aspect, the combiner has an upper end arranged at a location higher than an upper end of the meter apparatus.

With the fourth aspect of the present invention, the visibility of the virtual image is improved by the higher arrangement of the combiner.

The above and other objects, characteristics and advantages of the present invention will be clear from detailed descriptions of the preferred embodiment which will be provided below while referring to the attached drawings.

DESCRIPTION OF THE PREFERRED EMBODIMENT

In the following, an embodiment of the present invention is described with reference to the accompanying drawings. It is to be noted that forward, rearward, leftward, rightward, upward and downward directions in the following description are directions as viewed from an occupant of a two-wheeled motor vehicle.

Figure 1:
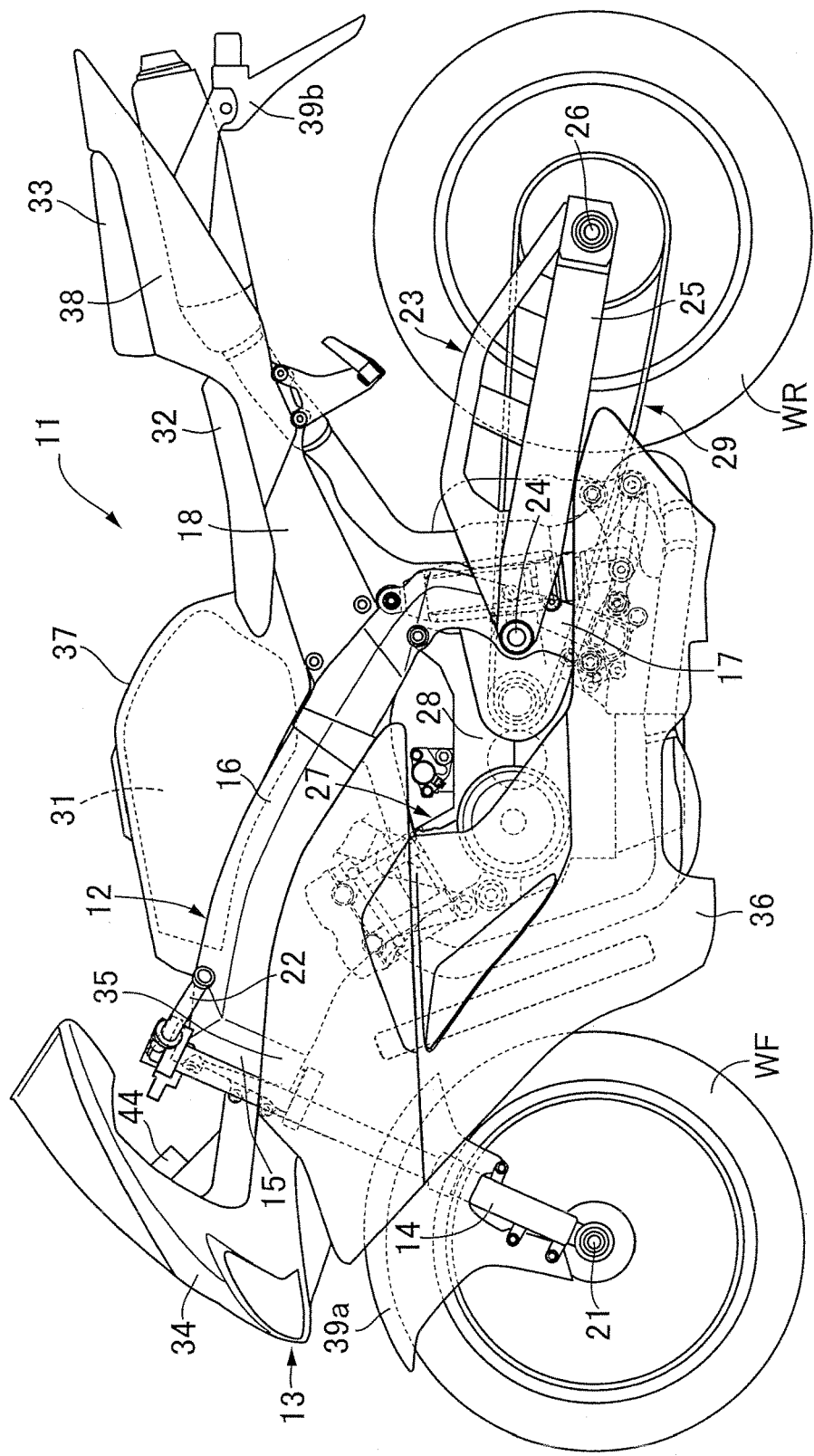
FIG. 1 is a side view of a two-wheeled motor vehicle according to an embodiment of the present invention.

FIG. 1 schematically depicts a structure of a two-wheeled motor vehicle 11 that is a saddle riding vehicle according to the embodiment of the present invention. The two-wheeled motor vehicle 11 includes a vehicle body frame 12, and a vehicle body cover 13 mounted on the vehicle body frame 12. The vehicle body frame 12 includes a head pipe 15 that steerably supports a front fork 14, a pair of left and right main frames 16 extending rearwardly downwardly from the head pipe 15, a pair of left and right pivot frames 17 extending downwardly continuously from a rear portion of the main frames 16, and a pair of left and right seat rails 18 extending rearwardly upwardly from a rear portion of the main frames 16. A front wheel WF is supported on the front fork 14 so as to be rotatable around an axle 21. A steering handlebar 22 is coupled to the front fork 14 above the head pipe 15. The vehicle body frame 12 is formed, for example, from a molded material of a metal material.

The two-wheeled motor vehicle 11 includes a rear wheel unit 23. The rear wheel unit 23 includes a swing arm 25 connected swingably in an up-down direction to a pivot frame 17 through a pivot 24 that extends leftwardly and rightwardly in a horizontal direction, and a rear wheel WR supported at a free end of the swing arm 25 so as to be rotatable around an axle 26 parallel to the pivot 24. The rear wheel WR is connected to the vehicle body frame 12 in this manner.

The two-wheeled motor vehicle 11 includes a water-cooled internal combustion engine 27. The internal combustion engine 27 includes an engine main body 28 supported on the vehicle body frame 12 and arranged below the main frames 16. Power of the internal combustion engine 27 is transmitted to the rear wheel WR through a power transmission system 29 including a transmission. The rear wheel WR is rotated in response to the power of the internal combustion engine 27.

The two-wheeled motor vehicle 11 includes a fuel tank 31 mounted on the main frames 16 above the internal combustion engine 27. On the seat rails 18 behind the fuel tank 31, a passenger's front seat 32 and a passenger's rear seat 33 are supported. The passenger's rear seat 33 is arranged behind the passenger's front seat 32.

The vehicle body cover 13 includes a front cowl 34, a pair of left and right center cowls 35, a lower cowl 36, a tank cover 37, and a rear cowl 38. The front cowl 34 is supported on the vehicle body frame 12, arranged just above the front wheel WF, and covers the head pipe 15 from the front side of the vehicle body. The left and right center cowls 35 are continuous from both the left and right sides of the front cowl 34 and cover a front portion of the vehicle body frame 12 and part of the internal combustion engine 27 from the lateral sides. The lower cowl 36 is continuous from a lower end of the center cowls 35 and covers a lower portion of the internal combustion engine 27 from the lateral sides and the lower side. The tank cover 37 covers the fuel tank 31 and also covers a front portion of the passenger's front seat 32 from the lateral sides. The rear cowl 38 is arranged below the passenger's rear seat 33 and covers the seat rails 18 from the lateral sides.

A front fender 39a is supported on the front fork 14 and covers at least part of the front wheel WF from above, and a rear fender 39b is supported at a rear portion of the seat rails 18 and covers the rear wheel WR from the rear upper side.

Figure 2:
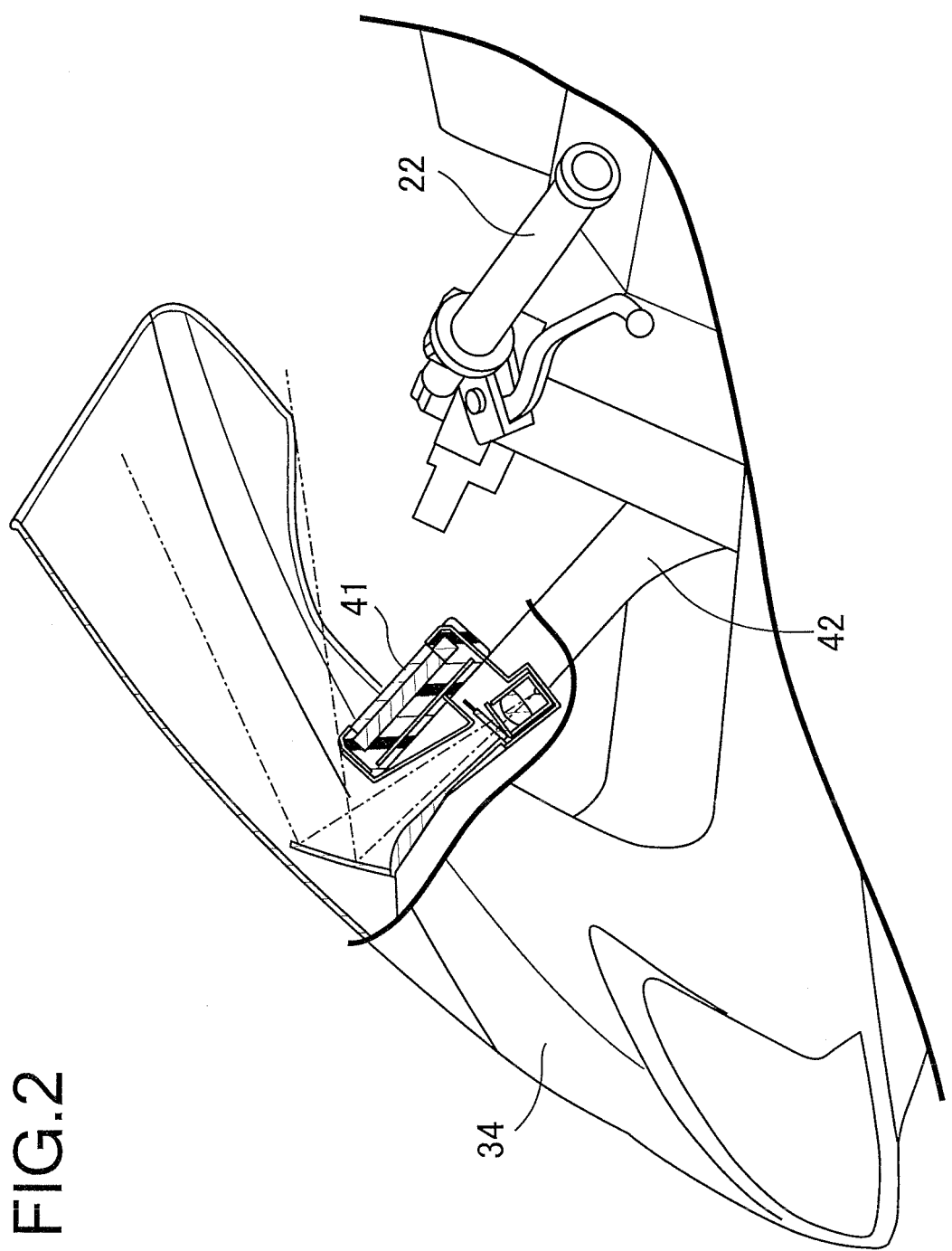
FIG. 2 is an enlarged vertical sectional view of a steering handlebar and its vicinity.

As depicted in FIG. 2, the two-wheeled motor vehicle 11 includes a head-up display unit (head-up display apparatus) 41 arranged in front of the steering handlebar 22. The head-up display unit 41 is fixed to a tip end of a bracket 42 on the inner side of the front cowl 34. The bracket 42 is coupled to the head pipe 15 and extends forwardly upwardly from the head pipe 15.

Figure 3:
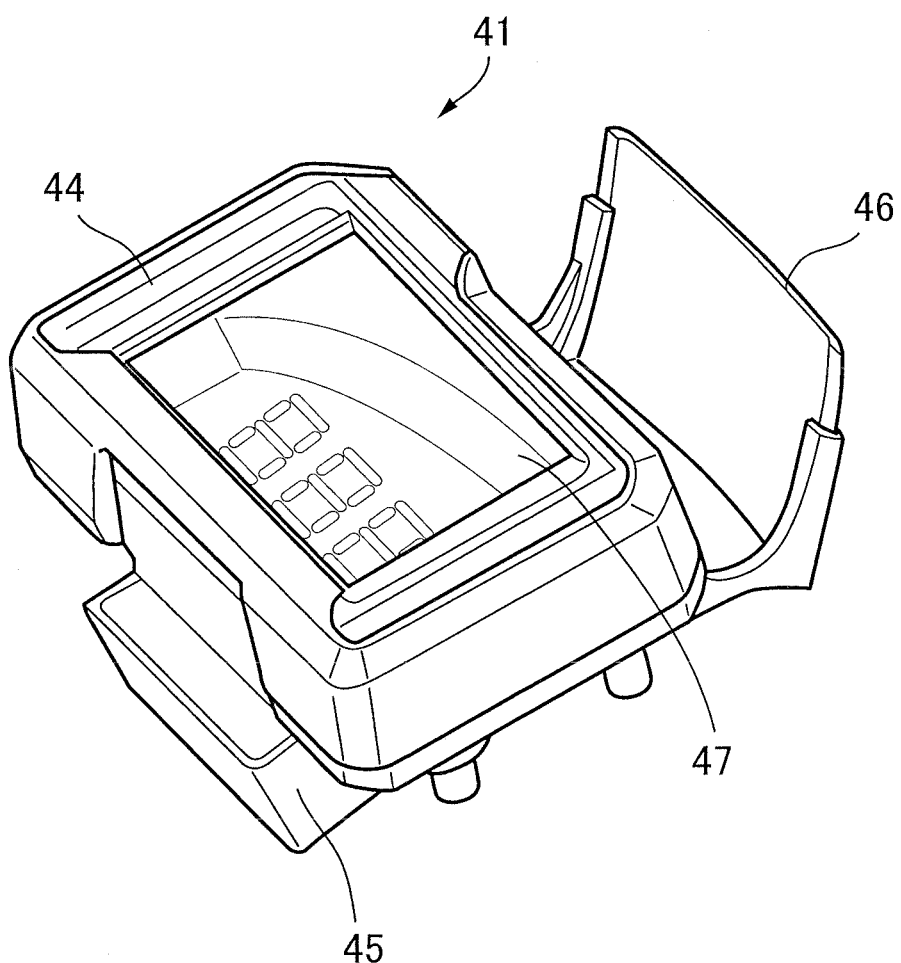
FIG. 3 is an enlarged perspective view of a head-up display apparatus.

As depicted in FIG. 3, the head-up display unit 41 includes a meter apparatus 44, a projection unit 45 and a combiner 46. The meter apparatus 44 has an upward or downward direction in response to a direction of a numeral or a character written thereon. The projection unit 45 is attached to the lower side (rear side when the meter apparatus 44 is mounted on the vehicle) of the meter apparatus 44 and displays a projection image. The combiner 46 is attached to an upper side (front side when the meter apparatus 44 is mounted on the vehicle) of the meter apparatus 44 and generates a virtual image on the basis of the projection image. In this manner, the meter apparatus 44 is arranged between the projection unit 45 and the combiner 46 in the front-rear direction of the vehicle. The meter apparatus 44 is arranged at a position overlapping with an optical path from the projection unit 45 to the combiner 46 as viewed in plan view. An image is projected from the projection unit 45 to the combiner 46. The meter apparatus 44 has a display panel 47 arranged thereon, which is formed in a shape of a box and displays meters such as a speedometer or a tachometer on the surface of a top plate thereof. The projection unit 45 is arranged at a lower location of the meter apparatus 44. As viewed in plan view, at least part of the projection unit 45 overlaps with the meter apparatus 44.

Figure 4:
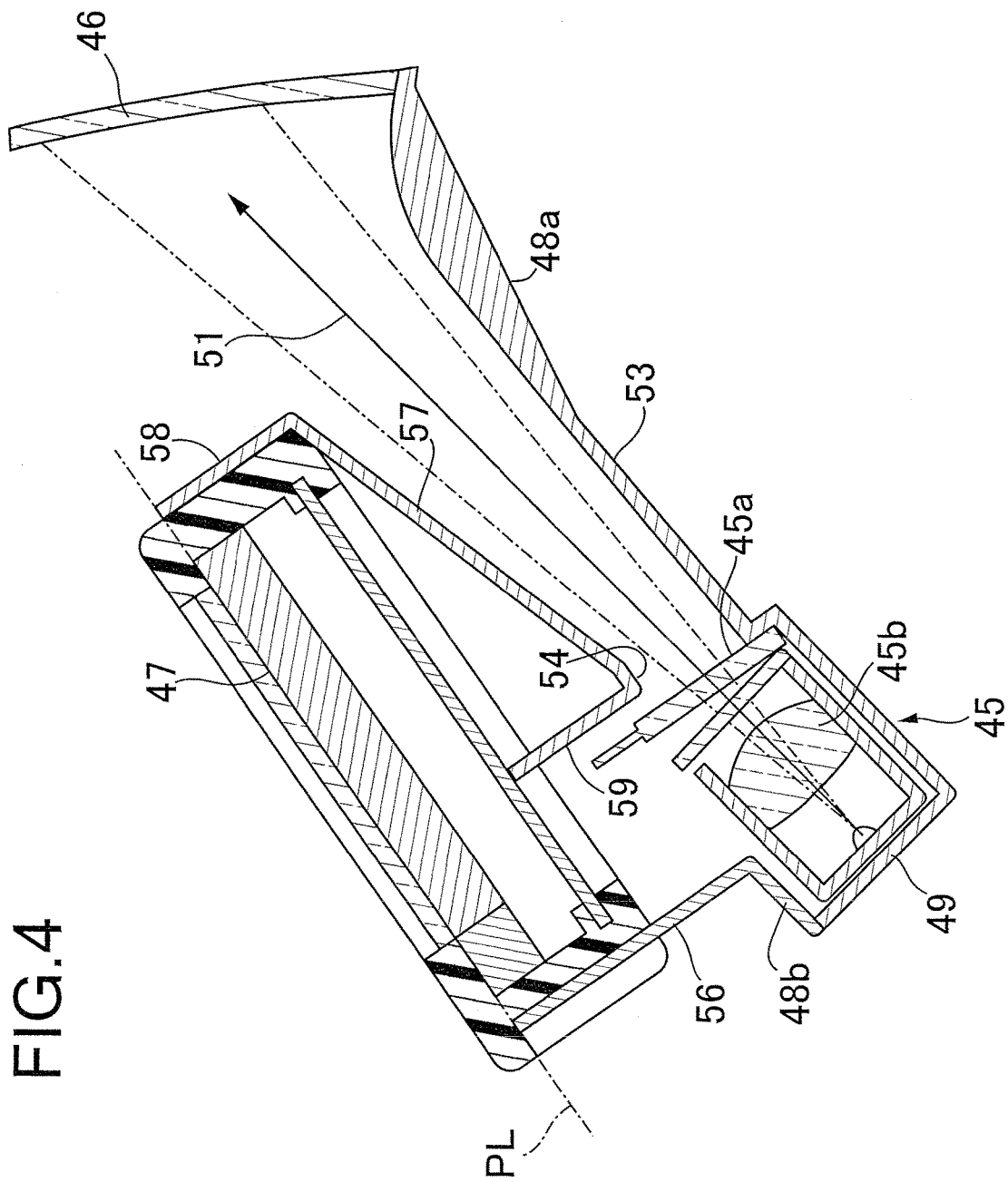
FIG. 4 is an enlarged vertical sectional view of the head-up display apparatus.
Figure 5:
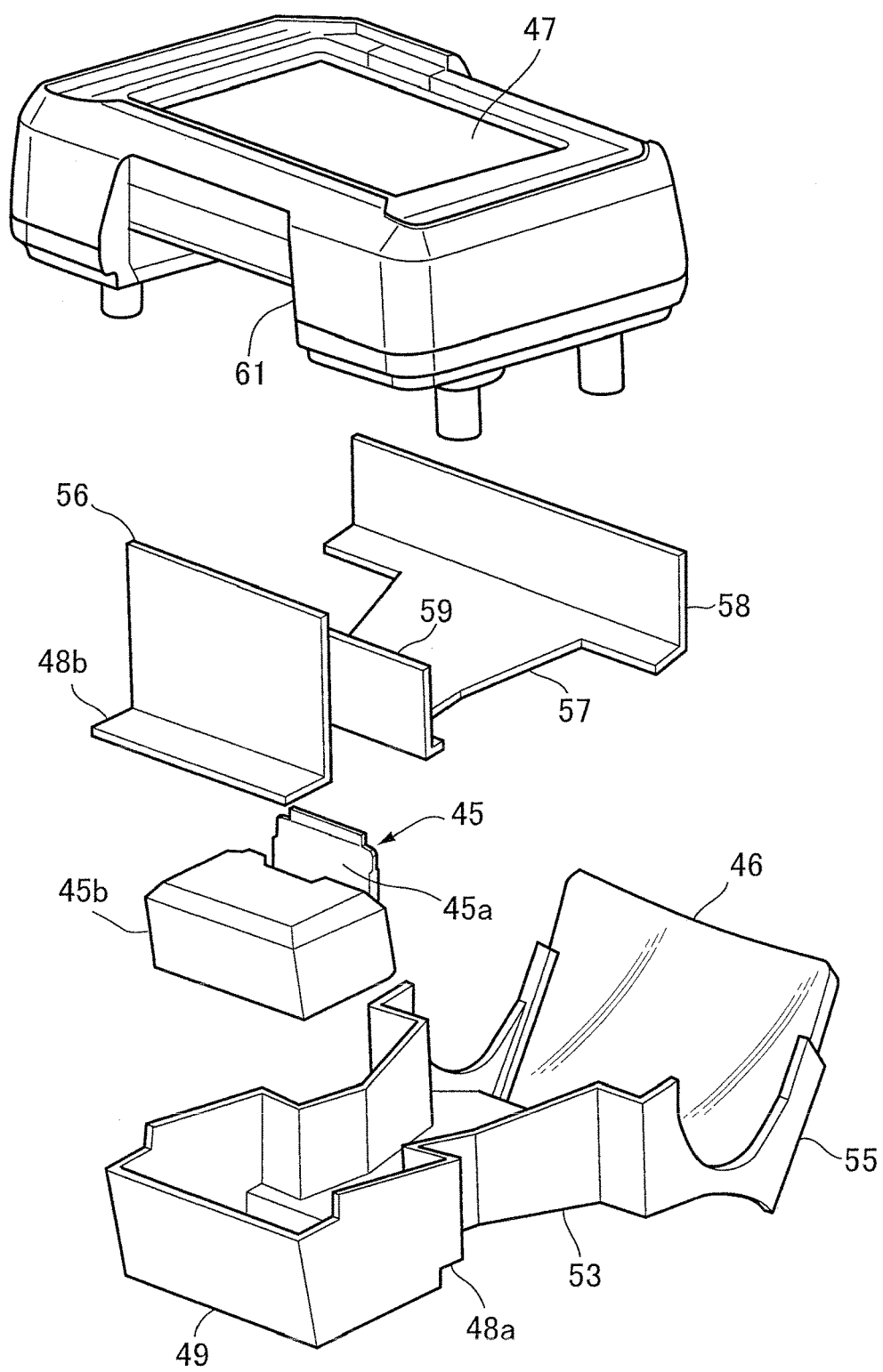
FIG. 5 is an exploded perspective view of the head-up display apparatus.

As depicted in FIGS. 4 and 5, the head-up display unit 41 includes a first exterior case 48a that supports the combiner 46 thereon, and a second exterior case 48b coupled to the first exterior case 48a. The first exterior case 48a includes a box body 49 that defines a first space in which a liquid crystal display panel 45a and a backlight 45b of the projection unit 45 are accommodated. The backlight 45b has an optical axis 51 that is inclined forwardly upwardly at a predetermined angle with respect to an imaginary plane PL including the surface (screen) of the display panel 47 of the meter apparatus 44. Accordingly, when the head-up display unit 41 is mounted on the vehicle, the display face of the meter apparatus 44 is inclined forwardly upwardly at a first angle with respect to the horizontal plane, and the optical axis of the projection unit 45 is inclined forwardly upwardly at a second angle greater than the first angle with respect to the horizontal plane. At this time, an upper end of the combiner 46 is positioned higher than an upper end of the meter apparatus 44 as depicted in FIG. 2.

On the front side of the box body 49, a passage body 53 is formed which defines a second space that extends from the first space toward the combiner 46. A projection opening 54 is defined between the passage body 53 and the box body 49 so as to open the first space to the second space. A frame body 55 is formed integrally on the front side of the passage body 53 and hold the edge of the combiner 46.

The second exterior case 48b includes a first wall body 56, a lid body 57, a second wall body 58 and a third wall body 59. The first wall body 56 is coupled to a rear wall of the box body 49 and extends along a vertical plane orthogonal to the imaginary plane PL. The lid body 57 is coupled to the passage body 53 of the first exterior case 48a and closes up the second space. The second wall body 58 is continuous from a front end of the lid body 57 and extends in parallel to the first wall body 56. The third wall body 59 is continuous from a rear end of the lid body 57 and extends in parallel to the first wall body 56. The first wall body 56 is fitted in a recessed portion 61 defined in a rear wall of the meter apparatus 44 and supports the meter apparatus 44 from the rear side. The second wall body 58 is in contact with a front wall of the meter apparatus 44 so as to support the meter apparatus 44 from the front side. The top of the third wall body 59 is abutted against a bottom plate of the meter apparatus 44 so that the third wall body 59 supports the meter apparatus 44 from the lower side. Accordingly, the housing of the meter apparatus 44 and the housing of the projection unit 45 and the combiner 46 (=first exterior case 48a+second exterior case 48b) are coupled to each other.

In the present embodiment, since the meter apparatus 44 is arranged at a position overlapping with the optical path (optical axis 51) from the projection unit 45 to the combiner 46 as viewed in plan view, a sufficient distance is secured between the projection unit 45 and the combiner 46 in the arrangement space of the meter apparatus 44 in comparison with that in an alternative case in which both the projection unit 45 and the combiner 46 are disposed in front of or in the rear of the meter apparatus 44. Therefore, the arrangement space is reduced, and reduction in space is implemented. Besides, the optical path length that is the distance between the projection unit 45 and the combiner 46 is secured sufficiently. Increase in size of the front cowl 34 can be avoided.

The projection unit 45 according to the present embodiment is arranged at a lower location of the meter apparatus 44 and is disposed so that at least part of the projection unit 45 overlaps with the meter apparatus 44 as viewed in plan view. Since the meter apparatus 44 covers the projection unit 45 from above in the direction of the gravity, the meter apparatus 44 can achieve a waterproof function and a dustproof function for the projection unit 45. Besides, since the meter apparatus 44, projection unit 45 and combiner 46 can be formed as an assembly, the head-up display unit 41 can be assembled simply to the vehicle body. Since the location from the projection unit 45 to the combiner 46 is reinforced by the housing of the meter apparatus 44 so as to increase the strength, the positional relationship between the light source of the projection unit 45 and the combiner 46 is less likely to be broken, and the projection accuracy of a virtual image can be secured.

In the present embodiment, the display face of the meter apparatus 44 is inclined forwardly upwardly at the first angle with respect to the horizontal plane, and the optical axis 51 of the projection unit 45 is inclined forwardly upwardly at the second angle greater than the first angle with respect to the horizontal plane. Since the optical axis 51 of the projection unit 45 is inclined with respect to the display face of the meter apparatus 44, the optical path length between the projection unit 45 and the combiner 46 can be secured while the length in the front-rear direction of the head-up display unit 41 is suppressed.

The upper end of the combiner 46 in the present embodiment is arranged at a location higher than the upper end of the meter apparatus 44. Accordingly, the visibility of the combiner 46 can be improved by the higher arrangement of the combiner 46.

As described above, the head-up display apparatus according to the present embodiment includes the meter apparatus 44 for a saddle riding vehicle having an upward or downward direction in response to a direction of a numeral written thereon, the projection unit 45 attached to the lower side of the meter apparatus 44 for a saddle riding vehicle and displaying a projection image, and the combiner 46 attached to the upper side of the meter apparatus 44 for a saddle riding vehicle and configured to generating a virtual image based on the projection image. By assembling the meter apparatus 44 for a saddle riding vehicle, projection unit 45 and combiner 46 into a single assembly, the head-up display unit 41 can be assembled simply to the vehicle body of the two-wheeled motor vehicle 11. Besides, since the distance between the projection unit 45 and the combiner 46 is secured sufficiently in an arrangement space of the meter apparatus 44 for a saddle riding vehicle, increase in the size of the head-up display unit 41 can be suppressed to the utmost.

While a preferred embodiment of the present invention has been described using specific terms, such description is for illustrative purposes only, and it is to be understood that changes and variations may be made without departing from the gist of the present invention.

What is claimed is:

1. A saddle riding vehicle, comprising:
   a meter apparatus; and
   a head-up display apparatus including a projection unit and a combiner to which an image from the projection unit is projected,
   wherein the meter apparatus is arranged at a position below an optical path from the projection unit to the combiner as viewed in plan view,
   and wherein the projection unit is coupled to a lower portion of the meter apparatus such that at least part of the projection unit overlaps with the meter apparatus as viewed in plan view.

2. The saddle riding vehicle according to claim 1, wherein the meter apparatus has a display face that is inclined forwardly upwardly at a first angle with respect to a horizontal plane, and the projection unit has an optical path that is inclined forwardly upwardly at a second angle greater than the first angle with respect to the horizontal plane.

3. The saddle riding vehicle according to claim 1, wherein the combiner has an upper end arranged at a location higher than an upper end of the meter apparatus.

4. A saddle riding vehicle, comprising:
   a meter apparatus; and
   a head-up display apparatus including a projection unit and a combiner to which an image from the projection unit is projected,
   wherein the meter apparatus is arranged at a position below an optical path from the projection unit to the combiner as viewed in plan view,
   and wherein the meter apparatus has a display face that is inclined forwardly upwardly at a first angle with respect to a horizontal plane, and the projection unit has an optical path that is inclined forwardly upwardly at a second angle greater than the first angle with respect to the horizontal plane.

5. The saddle riding vehicle according to claim 4, wherein the combiner has an upper end arranged at a location higher than an upper end of the meter apparatus.

* * * * *